United States Patent
Hering et al.

(10) Patent No.: US 8,646,956 B2
(45) Date of Patent: Feb. 11, 2014

(54) VEHICLE LIGHTING DEVICE WITH AT LEAST TWO SEMICONDUCTOR LIGHT-EMITTING ELEMENTS

(75) Inventors: Oliver Hering, Niederstotzingen (DE); Jenny Trommer, Heidenheim (DE); Thomas Reiners, Bachhagel (DE)

(73) Assignee: OSRAM Gesellschaft mit beschraenkter Haftung, Munich (DE)

( * ) Notice: Subject to any disclaimer, the term of this patent is extended or adjusted under 35 U.S.C. 154(b) by 413 days.

(21) Appl. No.: 12/994,773

(22) PCT Filed: May 28, 2009

(86) PCT No.: PCT/EP2009/003827
§ 371 (c)(1),
(2), (4) Date: Nov. 26, 2010

(87) PCT Pub. No.: WO2009/144024
PCT Pub. Date: Dec. 3, 2009

(65) Prior Publication Data
US 2011/0080753 A1    Apr. 7, 2011

(30) Foreign Application Priority Data
May 28, 2008    (DE) .......................... 10 2008 025 397

(51) Int. Cl.
*F21S 8/10* (2006.01)
(52) U.S. Cl.
USPC ...... 362/545; 362/249.02; 362/507; 362/544; 362/543; 362/538
(58) Field of Classification Search
USPC ............. 362/507, 538, 545, 249.02, 543, 544
See application file for complete search history.

(56) References Cited

U.S. PATENT DOCUMENTS

| | | | |
|---|---|---|---|
| 6,565,247 B2 | 5/2003 | Thominet | |
| 7,040,792 B2 * | 5/2006 | Brandenburg et al. | ....... 362/545 |
| 7,205,680 B2 | 4/2007 | Takeda et al. | |
| 7,347,597 B2 * | 3/2008 | French | .......................... 362/485 |
| 7,534,020 B2 | 5/2009 | Moisel | |
| 7,654,714 B2 | 2/2010 | Mochizuki et al. | |
| 7,762,699 B2 | 7/2010 | Reiners et al. | |
| 8,142,060 B2 * | 3/2012 | Saida et al. | .................... 362/539 |
| 8,267,561 B2 | 9/2012 | Baur et al. | |

(Continued)

FOREIGN PATENT DOCUMENTS

| | | |
|---|---|---|
| DE | 19813032 A1 | 9/1999 |
| DE | 10009782 A1 | 9/2001 |

(Continued)

OTHER PUBLICATIONS

International Search Report of PCT/EP2009/003827 dated Aug. 7, 2009.

(Continued)

*Primary Examiner* — Anabel Ton

(57) ABSTRACT

A vehicle lighting device having at least two semiconductor light-emitting elements may include at least a first light-emitting element group and a second light-emitting element group, each having at least one semiconductor light-emitting element, the light-emitting element groups being selectively drivable and the first light-emitting element group having at least a foglight function, the first light-emitting element group and the second light-emitting element group having a daytime running light function.

19 Claims, 7 Drawing Sheets

(56) References Cited

U.S. PATENT DOCUMENTS

| | | |
|---|---|---|
| 8,342,726 B2 * | 1/2013 | Fischer et al. .......... 362/521 |
| 2001/0019486 A1 | 9/2001 | Thominet |
| 2003/0147252 A1 | 8/2003 | Fioravanti |
| 2004/0042205 A1 | 3/2004 | Tanabe et al. |
| 2006/0007697 A1 | 1/2006 | Ackermann |
| 2008/0062706 A1 | 3/2008 | Feldmeier |
| 2008/0062712 A1 | 3/2008 | Woodward |
| 2008/0239746 A1 | 10/2008 | Wuller et al. |
| 2009/0129083 A1 | 5/2009 | An |

FOREIGN PATENT DOCUMENTS

| | | |
|---|---|---|
| DE | 10303430 A1 | 8/2003 |
| DE | 10341022 A1 | 3/2004 |
| DE | 10261183 B3 | 6/2004 |
| DE | 102004012185 A1 | 9/2004 |
| DE | 202004010950 U1 | 10/2004 |
| DE | 10308703 A1 | 11/2004 |
| DE | 102005014754 A1 | 10/2006 |
| DE | 102005041234 A1 | 3/2007 |
| DE | 102006015117 A1 | 10/2007 |
| DE | 102006021694 A1 | 11/2007 |
| DE | 102008013603 A1 | 9/2009 |
| EP | 1637397 A1 | 3/2007 |
| JP | 200871555 A | 3/2008 |
| JP | 2008513967 A | 5/2008 |
| WO | 2004007241 A2 | 1/2004 |
| WO | 2006034329 A2 | 3/2006 |

OTHER PUBLICATIONS

English abstract of EP 1637397 A1.
English abstract of DE 102006021694 A1.
English abstract of DE 10308703 A1.
English abstract of DE 202004010950 U1.
English abstract of DE 19813032 A1.
English abstract of DE 102008013603 A1 dated Sep. 17, 2009.

* cited by examiner

VEHICLE LIGHTING DEVICE WITH AT LEAST TWO SEMICONDUCTOR LIGHT-EMITTING ELEMENTS

RELATED APPLICATIONS

The present application is a national stage entry according to 35 U.S.C. §371 of PCT application No.: PCT/EP2009/003827 filed on May 28, 2009, which claims priority from German application No.: 10 2008 025 397.9 filed on May 28, 2008.

TECHNICAL FIELD

Various embodiments relate to a vehicle lighting device with at least two semiconductor light-emitting elements, e.g. light-emitting diodes, and to a vehicle with at least one such vehicle lighting device.

BACKGROUND

Until now, different headlamps have usually been used for different lighting functions of a vehicle such as daytime running light, upper beam, foglight and cornering light, with, in addition, a respective downstream optical element often being associated with said headlamps. In order to reduce costs and to save on physical space, attempts are made to reduce the number and size of the headlamps without reducing the functional efficiency of the headlamp. To this end, Bilux lamps or bi-xenon headlamps are known, for example, which are used to produce both the lower beam and the upper beam. In the case of the bi-xenon headlamp, a mask is merely folded out of the beam path and therefore "switched over" to the upper beam. In addition, a Bilux lamp is known for combining the daytime running light and foglight.

SUMMARY

Various embodiments provide a possibility for reducing the amount of space required and costs in vehicle lighting.

The vehicle lighting device has at least two semiconductor light-emitting elements, namely at least a first light-emitting element group and a second light-emitting element group, each having at least one semiconductor light-emitting element, the light-emitting element groups being selectively drivable. In addition, at least the first light-emitting element group has at least one foglight function. The vehicle lighting device therefore has a plurality of light-emitting elements which can be operated in at least two different lighting or light-emitting configurations, of which at least one is suitable for producing a foglight. A light-emitting configuration can include, for example, an on/off state and/or a predetermined luminous intensity state. The luminous intensity state can be achieved, for example, by setting an operating current through the light-emitting element, for example using a pulse duration during operation using pulse-width modulation, etc. The first light-emitting element group in this case produces at least some of a foglight beam or emits such a foglight beam, possibly together with at least one other light-emitting element group in the vehicle lighting device which has a foglight function.

Such a device makes it possible in a simple and inexpensive manner to integrate a plurality of light functions including a foglight function in a vehicle lighting device, which saves on space and costs.

For increased integration of types of illumination, it is preferred if the first light-emitting element group and the second light-emitting element group have a daytime running light function, i.e. the device has a daytime running light function which is provided by activating the first light-emitting element group and the second light-emitting element group. In other words, the first light-emitting element group and the second light-emitting element group (and possibly further light-emitting element groups with a daytime running light function) can produce a daytime running light (DRL) on corresponding activation. The first light-emitting element group therefore has at least two functions, namely that of producing a foglight and that of producing a daytime running light, while the second light-emitting element group has at least one daytime running light function. On activation of the daytime running light function, therefore, the first light-emitting element group and the second light-emitting element group are activated jointly.

In order to avoid glare for other road users, it is then preferred if the first light-emitting element group illuminates at a lower luminous intensity during activation of the daytime running light function than during activation of the foglight function. This can take place, for example, by reducing the luminous intensity of each of the associated light-emitting elements ("dimming"), which is preferred, or by selectively switching off individual light-emitting elements.

In order to achieve good visibility, it is particularly preferred if the second light-emitting element group in the daytime running light function illuminates a region which is in a region of darkness of the foglight function of the first light-emitting element group.

In order to integrate a further type of illumination, as an alternative to the daytime running light function or, preferably, in addition, at least the first light-emitting element group and second light-emitting element group can have an upper beam function. In this case, it is particularly preferred if the first light-emitting element group illuminates with a luminous intensity which approximately corresponds to the luminous intensity upon activation of the foglight function, in particular to a maximum luminous intensity by virtue of the light-emitting elements involved. For the case in which the second light-emitting element group also has a daytime running light function, it is preferred if it illuminates with a lower luminous intensity during activation of the daytime running light function than during activation of the upper beam light function.

In order to integrate yet a further type of illumination, in particular a cornering light function, the vehicle lighting device can further have a third light-emitting element group and/or a fourth light-emitting element group, each having at least one semiconductor light-emitting element, which have a cornering light function for a respectively opposite steering movement and/or a foglight function.

In order to realize a cornering light, it is preferred if the third light-emitting element group and/or the fourth light-emitting element group have a (dynamic or static) cornering light function for a respectively opposite steering movement. For example, the third light-emitting element group can be activated for cornering towards the left, and the fourth light-emitting element group for cornering towards the right. In general, for example, the speed, the steering angle and the yaw rate of the vehicle can be used for controlling a cornering light. This takes place, for example, in a control device of the vehicle electronics, which then passes on the necessary signals to light-emitting element drivers. In the case of a static cornering light, in addition the switch for the direction indicator can be used as the input variable for the algorithm.

As an alternative or in addition, the third light-emitting element group or the third and the fourth light-emitting element group can be activated during activation of the foglight, i.e. have a foglight function, while they are not activated during activation of the upper beam, i.e. do not have an upper beam function.

It is particularly preferred if the third light-emitting element group and/or the fourth light-emitting element group have a plurality of semiconductor light-emitting elements, which can each be activated at least depending on an associated steering angle, etc. The light-emitting elements in the third light-emitting element group and/or in the fourth light-emitting element group can be switched on in particular successively.

It may also be preferred if the first light-emitting element group has a cornering light function.

In this case, it can be preferred if at least the first light-emitting element group has a plurality of light-emitting elements, which can be activated independently of the other light-emitting elements in the first light-emitting element group and in a plurality of stages.

In particular, it may be preferred if, in the event of additional activation of at least one of the light-emitting elements in the first light-emitting element group, an associated illumination region is enlarged, in particular widened laterally. For example, to this end some of the light-emitting elements can be capable of being activated successively towards the edge, in particular with increments of a lateral light-emitting element interval.

It can be preferred if at least the first light-emitting element group and the second light-emitting element group do not have a common semiconductor light-emitting element.

In order to save on light-emitting elements, however, it may also be preferred if at least the first light-emitting element group and the second light-emitting element group have at least one common semiconductor light-emitting element.

In particular when the first light-emitting element group and the second light-emitting element group do not have a common semiconductor light-emitting element, it can be preferred if the first light-emitting element group and the second light-emitting element group can be driven independently of one another. If the first light-emitting element group and the second light-emitting element group have at least one common semiconductor light-emitting element, the common semiconductor light-emitting elements can emit with a plurality of types of illumination, possibly at different luminous intensities.

In addition, it is preferred if at least one semiconductor light-emitting element includes a semiconductor light-emitting element which emits white (cold white or warm white), yellow or white-yellow light.

In particular, it is preferred if at least one semiconductor light-emitting element includes at least one light-emitting diode, specifically a light-emitting diode emitting white light. The light-emitting diode emitting white light includes in particular a conversion LED, in which some of a primarily blue emitted light is converted by means of a light-emitting means into yellow light in order to produce a white light.

The light-emitting diode can be present, for example, in the form of an LED chip or an LED lamp. LED lamps, in contrast to LED chips, are housed individually and often have a reflector in their housing.

However, it can also be preferred, for example for varying the emission color depending on a type of illumination or a national standard, if the at least one light-emitting diode includes a set of light-emitting diodes which emit light of different colors ("LED clusters") and which can be driven in such a way that their light produces a white mixed light.

In this case, it can be preferred if the set of light-emitting diodes emitting light of different colors includes at least one light-emitting diode emitting red light, one light-emitting diode emitting green light and one light-emitting diode emitting blue light, in particular if the set of light-emitting diodes emitting light of different colors further includes at least one light-emitting diode emitting amber light in order to produce a "warm-white" hue.

It can also be preferred if an optical element, in particular a lens, is connected downstream of the set of light-emitting diodes, said optical element being common to these light-emitting diodes, for beam shaping and/or beam homogenization.

Preferably, the light-emitting elements in at least one of the light-emitting element groups are arranged in at least one row, for example in the form of a matrix with a row of n elements (1×n matrix) or in the form of a matrix with m rows of n elements (m×n matrix). However, another arrangement may also be provided, for example one which is not in the form of a matrix, such as one which is, for example, round or oval, polygonal, in particular triangular and more than rectangular, etc.

It is preferred if the light-emitting elements in at least two of the light-emitting element groups are arranged in in each case at least one row and the rows of these light-emitting element groups are arranged in parallel with one another, in particular in a horizontal arrangement one below the other (in the form of rows) with or without a gap, or in a vertical arrangement one next to the other (in the form of columns) with or without a gap.

It is preferred if semiconductor light-emitting elements in at least the first light-emitting element group and the second light-emitting element group are mounted on a common substrate, for example a printed circuit board or a submount. For example, one or more substrates can be populated with light-emitting elements in the first and second groups; but it is also possible, in addition, for substrates with light-emitting elements only in the first group and/or only in the second group to be provided.

It is preferred if all of the semiconductor light-emitting elements in at least the first light-emitting element group and the second light-emitting element group are mounted on a common substrate. Semiconductor light-emitting elements in further groups may also be present.

Although the light-emitting elements can be distributed among different substrates, it is preferred if all of the semiconductor light-emitting elements are mounted on a common substrate.

The substrate may be a printed circuit board or a submount. Preferably, the substrate is in the form of a submount, in particular a ceramic submount, for example consisting of AlN. A submount acts primarily as a carrier and heat-dissipating means for the light-emitting elements. The submount is particularly preferred for mounting light-emitting diode chips. The submount preferably consists of an electrically insulating material with good thermal conductivity, for example AlN.

In a particularly preferred configuration, the submount bears one or more LED chips, preferably LED chips which are applied to the submount using surface mounting technology; the emitter surface of the LED chips is substantially parallel to the surface of the submount. For surface-mounted LED chips emitting white light, it is preferred if the wavelength conversion material ("phosphor") is applied directly and flat to the primary emitter surface. The LED chips can be configured to be identical or different. In particular, differently configured light-emitting diodes can be used for each of the light-emitting element (in this case LED) groups. In a particularly preferred embodiment, LED chips with emitter surfaces of different sizes are used for at least two of the LED groups.

For lateral illumination, it can be particularly preferred if an illumination region of the first light-emitting element group is asymmetrical with respect to a lateral extent.

In order to produce a desired illumination region, it may be preferred if the device further has at least one optical element, which is connected downstream of at least one semiconductor light-emitting element, for configuring a light distribution of the light emitted by the at least one semiconductor light-emitting element.

For uniform illumination, it is preferred if the at least one optical element is designed to homogenize the light emitted by the at least one semiconductor light-emitting element.

To this end, it is especially preferred if the homogenization includes color homogenization of the light emitted by the at least one semiconductor light-emitting element, in particular when using white mixed light from differently colored light-emitting elements.

To this end, it is also preferred if the homogenization includes intensity homogenization of the light emitted by the at least one semiconductor light-emitting element.

It can also be preferred if the at least one optical element is designed to concentrate, in terms of region, the light emitted by the at least one semiconductor light-emitting element, for example for achieving a specific shape of the imaging region. Within the region in which the light is concentrated, this can preferably be configured to be homogeneous.

It is preferred, in particular for shaping the illumination region, if the at least one optical element includes an imaging optical element, in particular a lens, for imaging or shaping the light emitted by the at least one semiconductor light-emitting element onto the associated illumination region.

In general, two or more optical elements with different functions can be connected downstream of one another, for example a first optical element ("primary optical element") which is connected downstream of a light-emitting element for light homogenization and concentration (shaping of the image) and a second, substantially only shaping optical element ("secondary optical element") which is connected downstream of said first optical element.

It may be preferred if the at least one optical element is connected downstream of an associated light-emitting element group.

In particular, it is preferred if an optical element is connected downstream of all of the light-emitting element groups, i.e. represents a common optical element for all of the light-emitting elements.

It can be preferred if the optical element includes a reflector.

In addition or as an alternative, it can be preferred if the optical element includes an optical waveguide. This can be manufactured from glass or plastic, for example.

It is also preferred if the vehicle lighting device also has a drive circuit, in particular a driver, for operating at least two light-emitting element groups, preferably for operating all of the light-emitting element groups. Although, in the extreme case, each group can have dedicated drive electronics, this is involved and costly.

In particular, it is preferred if the drive circuit is mounted on a substrate and is envisaged for group-specific operation of semiconductor light-emitting elements which are likewise mounted on this substrate. However, the drive circuit can also be arranged separately, for example on a printed circuit board, which also bears the submount or submounts.

It is also preferred if, when the vehicle lighting device is switched on, i.e. when at least one light-emitting diode of the vehicle lighting device is switched on, there is a substantially identical load of the semiconductor light-emitting elements in each type of illumination, for example foglight, daytime running light, cornering light, etc. This can preferably be achieved by virtue of the fact that, in the case of at least two, particularly preferably all, types of illumination, an identical number of light-emitting elements is activated.

For simple driving of the light-emitting elements, it can be preferred if at least two sets of light-emitting elements are connected electrically in parallel and are associated with a different type of illumination or illumination configuration, with the device switching over between the sets in order to switch between the types of illumination, for example by means of a transistor or another logic circuit. Preferably, all of the parallel branches have the same load. In particular, it is preferred if the light-emitting elements are each connected electrically in series in all of the parallel branches.

It can also be preferred if at least one further set of light-emitting elements is connected electrically in series with at least two of the sets of light-emitting elements which are connected electrically in parallel. These light-emitting elements in the further set are continuously activated light-emitting elements with respect to the types of illumination associated with the parallel branches which are connected in series with said light-emitting elements.

For flexible, in particular independent driving, it can also be preferred if the light-emitting element groups are connected electrically in series and at least one switch is connected in parallel with each light-emitting element group.

Then, it is preferred if at least one resistor is connected electrically in series with at least one switch, preferably with each of the switches, since a substantially identical load can thus be maintained even in the event of a variable number of light-emitting elements.

The luminaire, possibly together with other lamps, such as for producing a lower beam or an indicator lamp, for example, is designed for use in a vehicle headlamp and has at least one such vehicle lighting device.

The vehicle headlamp is equipped with at least one such luminaire of at least one such vehicle lighting device.

The vehicle has at least one such vehicle headlamp.

The vehicle is preferably equipped with at least two such vehicle headlamps, whose illumination regions of the associated vehicle lighting device are asymmetrical in laterally inverted fashion when the foglight function is activated.

As a result, in particular the first vehicle lighting device can be provided on a left-hand side and the second vehicle lighting device can be provided on a right-hand side, and a maximum illumination region of the first vehicle lighting device can extend further towards the left with respect to a longitudinal direction of the vehicle and a maximum illumination region of the second vehicle lighting device can extend further towards the right with respect to a longitudinal direction of the vehicle.

Preferably, when the foglight is switched on, the vehicle lighting devices illuminate their respective maximum foglight illumination region.

Preferably, when the foglight is switched on, the light-emitting element groups having a foglight function illuminate with maximum luminous intensity.

Preferably, at least that light-emitting element group which has a foglight function and has an illumination region which extends further laterally in the steering direction illuminates, when the lower beam is switched on and therefore the daytime running light is switched off, or preferably illuminates when a cornering light function is used during cornering, an illumination region which is laterally wider than when traveling straight on in the steering direction.

Preferably, when using the cornering light function during cornering, the area of the widened illumination region is independent of a size of a steering angle (static cornering light).

However, it can also be preferred if, when using the cornering light function during cornering, the area of the widened illumination region is dependent on a size of a steering angle such that, in the event of a more considerable steering angle, the illumination region is enlarged tendentially, in particular widened, specifically until a maximum illumination region is reached (dynamic cornering light).

By means of the abovementioned teaching, a semiconductor light-emitting element system, in particular an LED system, with at least two illumination functions or light functions up to a maximum of four light functions can therefore be realized.

It is thus possible to use one system or one device to realize illumination functions which are based at least on daytime running light, foglight (front fog lamp), cornering light, upper beam, for example:
 daytime running light and foglight;
 daytime running light and foglight and cornering light (static cornering light);
 foglight and dynamic cornering light;
 daytime running light and foglight and upper beam; etc.

Preferably, an LED module (LED chip(s) on a submount with an associated drive circuit) with at least two rows of chips is used as a light source, these rows of chips being capable of being switched and dimmed independently of one another. Preferably, an imaging optical element (in particular a lens) which images the two rows of chips towards the front in front of the vehicle is located in front of the rows of chips. Optionally, light which is not directly incident on the lens can be supplied to the light distribution by means of a reflector. One or more rows form the foglight distribution, i.e. a light distribution with a light-dark boundary. For the daytime running light function, preferably one or more additional rows of chips with a specific power are connected into the circuit, with the result that a light distribution is also produced beyond the light-dark boundary. The rows of chips which are responsible for the front fog lamp function are preferably dimmed appropriately such that, overall, a homogeneous light distribution is produced which adheres to the regulations for the daytime running light. The rows of chips can be symmetrical, asymmetrical, of equal size or of different sizes and include an identical or different number of chips or even have in each case only one chip.

In particular, the foglight distribution or arrangement can be configured such that the requirement of the cornering light is also met. During operation of the vehicle, this can mean that, when the foglight is switched on, both fitting sides on the vehicle illuminate, whereas, when the foglight is switched off and the lower beam is switched on (and therefore the DRL is switched off), only the luminaire corresponding to the steering angle is activated. If, for example, the vehicle is steered towards the right, only the right-hand fitting side on the vehicle illuminates. This can additionally be implemented in such a way that, depending on the steering angle, a different number of LEDs is activated in order to thus achieve dynamic illumination of the cornering light.

It is possible to provide a "primary optical element" between the chips and a lens (as "secondary optical element"), which primary optical element (a) mixes the light from the individual chips in order to achieve, for example, a more homogeneous color and/or illumination and/or (b) predefines a light distribution. This primary optical element can comprise a reflector and/or an optical waveguide, for example.

The LED module is preferably connected to electronics in such a way that the different semiconductor emitters (in particular LEDs) used can be operated individually or together in a plurality of groups. In principle, each group or each array can be provided with a separate current regulator, but this is cost-intensive and involved. In the preferred, inexpensive embodiment, different LED groups are connected in series and in parallel such that the same number of chips is always present as the load at the output of an associated driver and the "geometry" of the chip array or the LED group is changed from a linear geometry to square geometry, for example by shifting a "toggle switch" (implemented in practice preferably by switching transistors). Other changes to the geometry are likewise conceivable.

In another exemplary embodiment, for example, LED groups can be connected in series and a switching transistor which can short-circuit the array such that it is inactive can be connected in parallel with each of the groups or arrays. In this case, a resistor for current reduction can optionally be connected into the parallel branch. In this embodiment, individual LEDs or LED groups can be addressed with a single driver module, but this usually operates on variable load.

An advantage of the present invention is that at least two different light functions, in particular at least daytime running light and foglight, are generated from a single system (plurality of rows of chips+optical element). This results in a reduced space requirement, fewer plugs and cables, i.e. lower costs. If the foglight is designed such that the requirements as regards the cornering light are met as well, the system can be used for three light functions, for example, namely in particular for daytime running light, foglight and cornering light.

If the system is in the foglight or cornering light mode, the chips used can be energized to the maximum extent without the system overheating. If the additional row(s) of chips required for the daytime running light is activated, the cooling concept could possibly overload (system or chip becomes too hot). As a result of the dimming of the foglight function, however, the heat development can be reduced, with the result that the system can be designed in the "daytime running light" operating mode such that, overall, it is within the boundaries of the cooling concept (chips do not become too hot).

BRIEF DESCRIPTION OF THE DRAWINGS

In the following figures, the invention will be described in more detail schematically with reference to exemplary embodiments. In this case, identical or functionally identical elements may be provided with the same reference symbols for the purposes of improved clarity.

DETAILED DESCRIPTION

The following detailed description refers to the accompanying drawings that show, by way of illustration, specific details and embodiments in which the invention may be practiced.

Figure 1A:
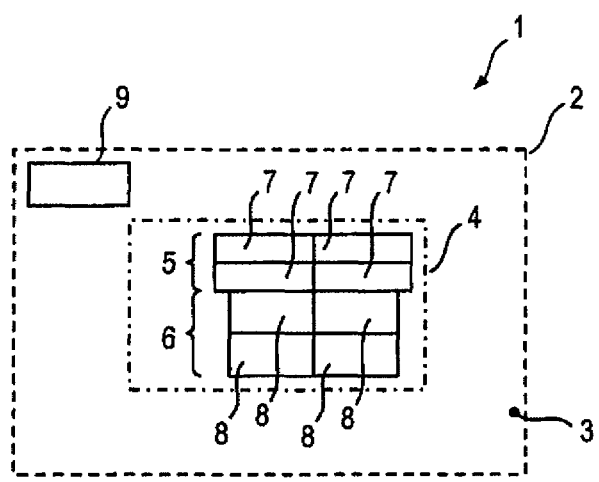
FIG. 1A shows a plan view of an LED module of a vehicle lighting device.

FIG. 1A shows, as part of a vehicle lighting device 1, an LED module 2. The LED module 2 has a printed circuit board 3, to which an AlN submount 4 is attached. A first LED group 5 with four white, surface-mounted LED chips 7 arranged in the form of a 2×2 matrix and a second LED group 6, directly adjacent to and beneath said first LED group 5, likewise with four white, surface-mounted LED chips 8 arranged in the form of a 2×2 matrix are arranged on the AlN submount 4. The LED chips 7 and 8 are therefore arranged in two rows each having two elements. The surfaces of the LED chips 7 and 8 approximately correspond to the emitter surfaces and are not housed individually. The emitter surface of the LED chips 7 differs from the emitter surface of the LED chips 8 to the extent that it is broader and flatter. In general, the rows of chips can be configured to be symmetrical or asymmetrical as well as equal in size or of different sizes and can contain an identical or different number of chips or even have in each case only one chip. The light-emitting diodes 7, 8 of the different groups 5, 6 can likewise be configured differently, for example with respect to a number of light-emitting diodes, luminous intensity of the light-emitting diodes, size of the emitter surface and arrangement of the light-emitting diodes.

In addition, drive electronics 9 in the form of an electronic driver module which are used to drive the LED groups 5, 6 and the LEDs 7, 8 associated therewith are provided on the printed circuit board 3. The two LED groups 5, 6 can be driven independently of one another, for example can be activated individually or jointly, by means of the drive electronics 9. When an LED group 5, 6 is activated, the LEDs 7 and 8, respectively, associated with this group 5, 6 are driven or operated identically in the present exemplary embodiment. In this case, primarily a luminous intensity of the LED groups 5 and 6 is set by means of the drive electronics and by means of the driver 9, respectively, by an operating current passed through the LED chips 7 and 8, respectively, being set. Alternatively, specific LED chips 7, 8 in a group 5, 6 can be activated and deactivated. Further elements, such as cables, conductor tracks, etc., which are provided for the operation of the vehicle lighting device 1 are not illustrated in any further detail.

In the exemplary embodiment shown, the first group 5 serves both to provide a foglight function or as a front fog lamp light source and to provide a daytime running light function or as a light source for a daytime running light. The lower, second LED group 6 has a daytime running light function, i.e. it serves to produce a daytime running light.

Figure 1B:
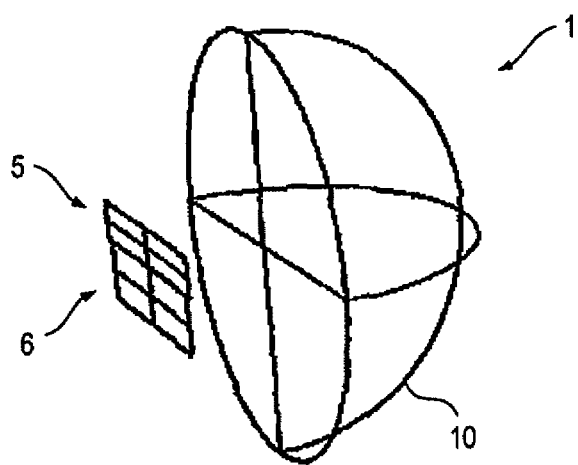
FIG. 1B shows an angled view of LED groups of the LED module shown in FIG. 1 with a lens, connected downstream, of the vehicle lighting device.

FIG. 1B shows the LED groups 5, 6 of the vehicle lighting device 1 in addition with a common lens 10, which is connected downstream of said LED groups and acts as a secondary optical element, as is described further below in more detail with reference to FIG. 4. The light produced by the LED groups 5, 6 and the light-emitting diodes 7, 8 contained therein is imaged by means of the lens 10 in order to produce an associated illumination region in front of the vehicle. In particular, a maximum contour of the illuminated region is fixed thereby. The figure does not show further imaging forms of the elements, such as a primary optical element, a mask, etc., but these may be provided.

Figure 2A:
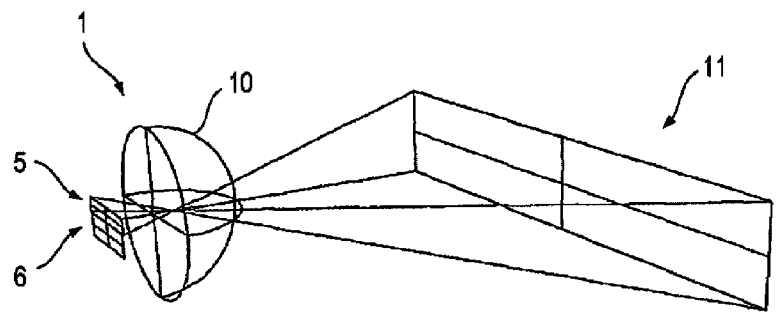
FIG. 2A shows a view at an angle of a sketch of an illumination region of a first LED group using the vehicle lighting device shown in FIG. 2.
Figure 2B:
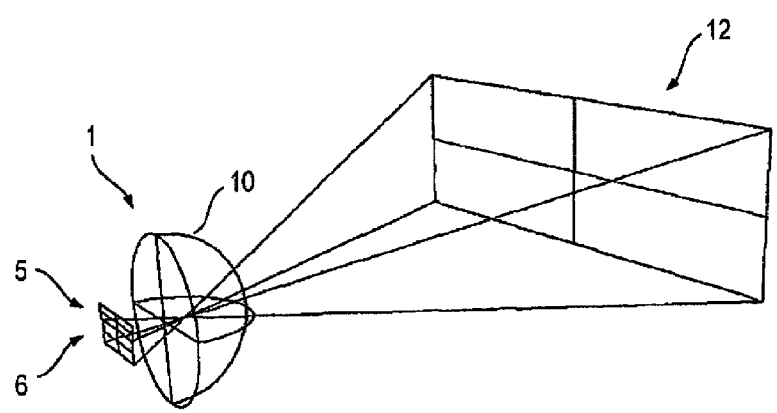
FIG. 2B shows a view at an angle of a sketch of an illumination region of a second LED group using the vehicle lighting device shown in FIG. 2.
Figure 2C:
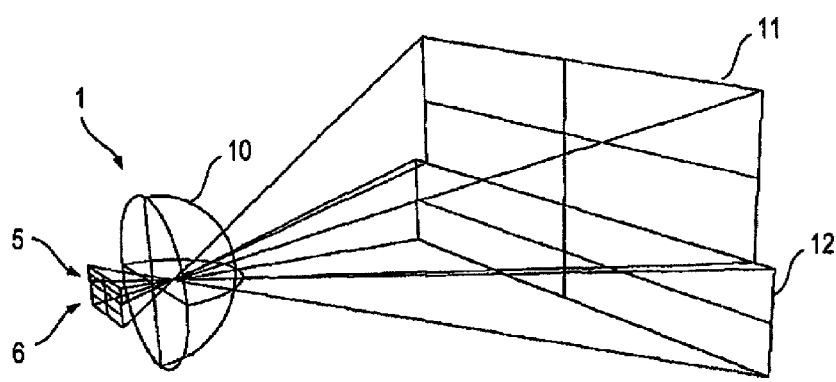
FIG. 2C shows a view at an angle of a sketch of a combined illumination region of the first and the second LED group using the vehicle lighting device shown in FIG. 2.

FIG. 2A shows an illuminated region 11 during activation of only the first group 5 of light-emitting diodes for a foglight function. FIG. 2B shows an analogous illustration in which the second group 6 or the light-emitting diodes thereof is activated, however. FIG. 2C shows the illuminated region with the two groups 5, 6 jointly activated.

When the foglight (front fog lamp) is switched on, the requirements placed on a foglight are already met by the first group 5 shown in FIG. 2A. To this end, the first group 5 illuminates with a maximum luminous intensity by virtue of all four LED chips being energized to the maximum extent.

On the other hand, when only the second group 6 shown in FIG. 2B is activated, a requirement placed on a type of illumination, for example a daytime running light or an upper beam, is not yet met.

Only when, as is shown in FIG. 2C, the first group 5 and the second group 6 are activated jointly are the requirements placed on a further type of illumination, for example a daytime running light or an upper beam, met.

In order to fulfill a daytime running light function, the luminous intensity of the first group 5 is set so as to be much weaker ("dimmed") in comparison with the activation of the foglight function in order to eliminate any glare of oncoming traffic or to meet the demands of the corresponding regulations. The dimming of the first group 5 can take place either by means of all LEDs in this group being dimmed, by individual LEDs in this group being dimmed or by individual LEDs being selectively switched off. At the same time, the luminous intensity of the second LED group 6 is likewise so weak that glare is eliminated with at the same time good visibility. Preferably, the first group 5 is faded down to such an extent that there is no sudden change in intensity at the boundary of the illumination region 11 produced by the first LED group 5 over the jointly illuminated region 11, 12. In order to maintain a luminous intensity distribution which is as homogeneous as possible in the illumination region 11 which is produced by the first LED group 5, it is preferred if all of the LEDs in the first group 5 are activated, but are dimmed.

In order to fulfill an upper beam function, the luminous intensity of the first group 5 remains unaltered in comparison with the activation of the foglight function. At the same time, the LEDs in the second LED group 6 are also energized to the maximum extent. In order to reduce the heat losses of the system, individual LEDs in the group 5 can be dimmed or switched off, with preferably those LEDs being dimmed or switched off which produce light in the outer region of the light distribution and are not necessarily required for an upper beam function. The same applies to the LEDs in group 6.

At least the three described light functions, namely the daytime running light, the foglight and the upper beam, can therefore be provided by means of the vehicle lighting device shown with a very small space requirement and, owing to the low wiring complexity, reduced costs.

The shape of the illumination regions 11, 12 corresponds, in vertically inverted form, substantially to the shape of the emitter surfaces of the LED groups 5, 6. Alternatively, the imaging optical element can alter the shape and intensity distribution, etc. of the emitter surfaces. For example, a symmetrical emitter surface can be imaged so as to be wider on one side in order to improve lateral illumination and/or to provide a cornering light with a simple light emitter shape. It is also possible, for example, for certain areal components of the illumination region to illuminate at a higher intensity than others.

Figure 3:
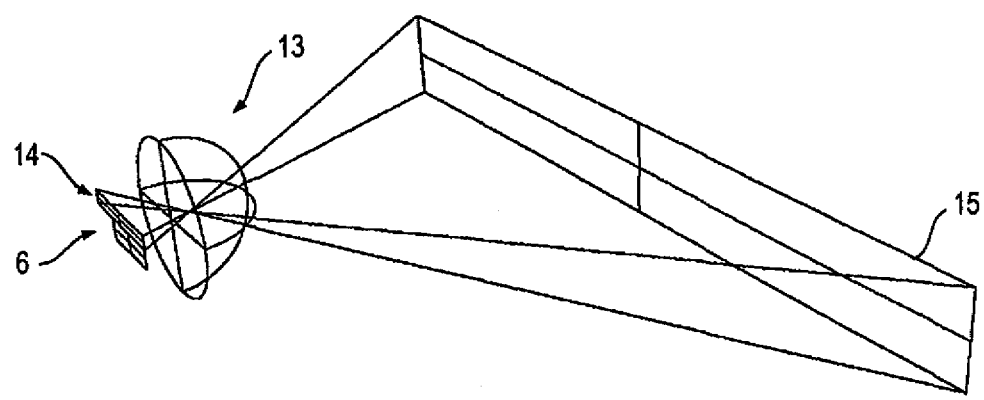
FIG. 3 shows a view at an angle of a sketch of an illumination region of a first LED group in accordance with a further embodiment similar to the view shown in FIG. 2A.

FIG. 3 shows a further exemplary embodiment of a vehicle lighting device 13, in which, in contrast to the vehicle lighting device 1 shown in FIG. 2, the emitter surface of the first group 14 of four light-emitting diodes arranged in a 2×2 matrix form is now no longer arranged symmetrically with respect to the second group 6, but extends further towards one side than towards another. In the image shown, an illumination region 15 which is extended towards the right is thus produced. Such a vehicle lighting device 13 can be used in particular for illuminating a right edge to a greater extent, specifically when installed on a right-hand side of a vehicle. This can be used in particular for using the vehicle lighting device 13 additionally with a cornering light function.

In order to produce a foglight (foglight function), furthermore, the four light-emitting diode chips in the first LED group 14 would be energized to a maximum extent. In order to produce a daytime running light, the second LED group 6 would emit light with a comparatively low luminous intensity; in the case of the first LED group 14, then all of the LEDs or only the two right-hand LEDs could be activated fully or dimmed. In order to produce a cornering light, none of the LEDs or only the two right-hand LEDs which illuminate a subregion further towards the roadway can be activated for example when traveling straight on, whereas, when traveling around a corner, all of the LEDs or only the two left-hand LEDs in the first group which illuminate a subregion further towards the edge are connected. The luminous intensity of the cornering light can either be fixed or be variably adjustable.

In a vehicle, a correspondingly laterally inverted vehicle lighting device which illuminates the left-hand edge to a greater extent would expediently be fitted on the left-hand side, for example linked to a left-hand vehicle headlamp.

Figure 4:
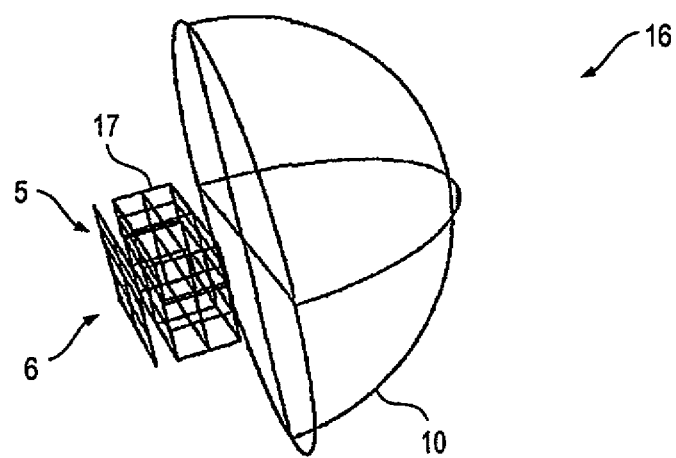
FIG. 4 shows a view at an angle of elements of a further embodiment of a vehicle lighting device.

FIG. 4 shows a further embodiment of a vehicle lighting device 16, in which a further optical element ("primary optical element") 17 is now arranged between the LED groups 5, 6 and the lens 10. The primary optical element 17 in this case serves in particular to homogenize the intensity and/or color of the light emitted by the LED groups 5, 6 and to initially shape the imaging region or illumination region. For this purpose, the primary optical element 17 is in this case configured as a glass body in the form of a truncated pyramid with a rectangular bottom and top surface. Alternatively, for example, a CPC body, a convex or concave lens, a Fresnel lens can be used. Also, the primary optical element can be configured to be opaque, entirely or partially color-filtering or transparent or can be configured so as to be impermeable to light in regions, and the bottom and top surface can be optimized with respect to the emitter surfaces (chip or group arrangement) and the light function and can deviate from a rectangular geometry.

Figure 5:
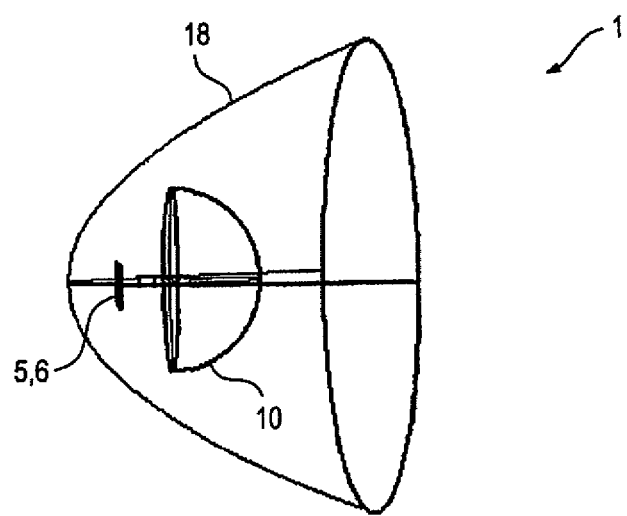
FIG. 5 shows a side view of the vehicle lighting device shown in FIG. 1 with a reflector and a lens.

FIG. 5 shows the vehicle lighting device 1 with a parabolic reflector 18, which serves the purpose of reflecting light emitted laterally by the LED groups 5, 6, which light is not incident on the lens 10, in such a way that it can be used for the illumination. For this purpose, the light can be reflected either past the lens 10 or onto the lens 10. As a result, the luminous efficacy is improved. The reflector can alternatively be in the form of a free-form reflector, for example. It is also possible for one or more primary optical element(s), not shown, to be provided.

Figure 6A:
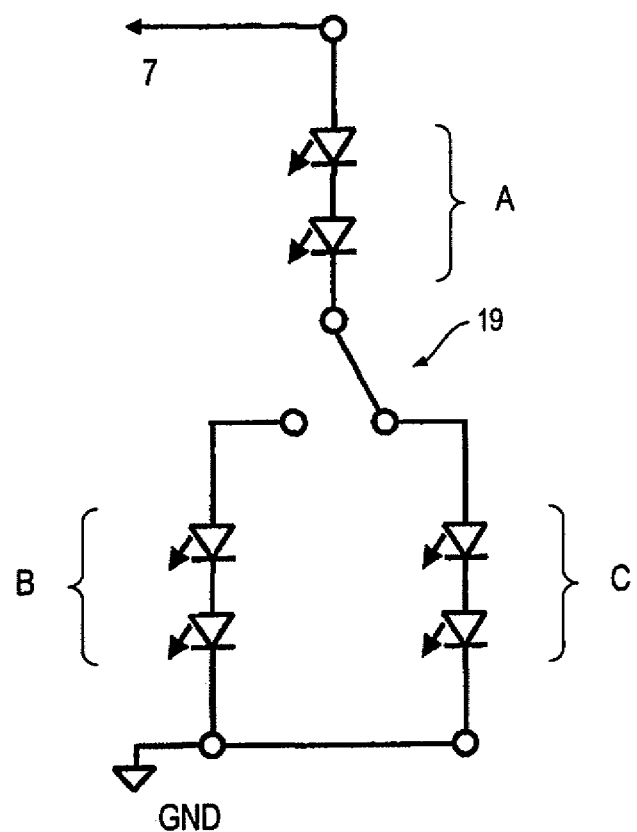
FIG. 6A shows a possible principle circuit diagram of LED groups of a vehicle lighting device.
Figure 6B:
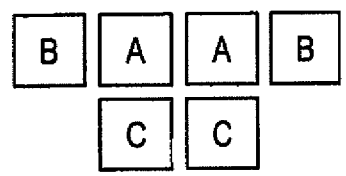
FIG. 6B shows a plan view of a physical arrangement of the LED groups shown in FIG. 6A.

FIG. 6A shows a possible wiring configuration for three sets A, B and C of light-emitting diodes, whose geometrical arrangement is shown in FIG. 6B. For example the sets A and B can correspond to a first LED group and the set C can correspond to a second LED group in the style of FIG. 1.

While the sets B and C are connected electrically in parallel, both are connected in series with set A. The sets A, B and C are connected between an output of a driver 7 and a connection to ground GND. A toggle switch in the form of an electronic switch, in particular a transistor 19, is inserted between set A, on one side, and sets B and C, which are connected in parallel, on the other side, with the result that a current path between the two parallel branches can be switched over with respect to the LED sets B and C. In other words, a current flow can be switched over between a current flow through the LED set A and the LED set B, on the one hand, and the LED set A and the LED set C, on the other hand. The load of each of the groups is substantially identical, with the result that, during switchover between the two LED sets B and C, the load remains substantially constant over the entire current path. As a result, a drive circuit with a constant load control can be used, which results in a further cost reduction. This can be achieved, for example, by virtue of the fact that substantially identical LEDs are used in identical numbers with respect to the LED groups B and C. Alternatively, each set A, B, C can of course be provided with a separate driver, but this is cost-intensive and involved.

This circuit makes it possible to switch over between a foglight and an upper beam, for example with particularly little complexity using a constant current source, in particular a simple voltage source. The foglight is produced by the sets A and B, while the upper beam is produced by the sets A ("halved" foglight illumination region) and C. It is presupposed here that the LEDs have an identical power consumption.

If the system is in the foglight mode, the LED system is designed such that the four used chips can be energized to the maximum extent without the system overheating. If set C which is required for the upper beam is activated, the cooling concept could possibly overload (system or chip becomes too hot). By virtue of set B being switched off, however, the development of heat can be kept constant, with the result that the LEDs do not become too hot. When using a current source with variable power, it is possible in this case also for dimming to be implemented, in which all of the LEDs with one switching state are energized to the same extent.

Figure 7:
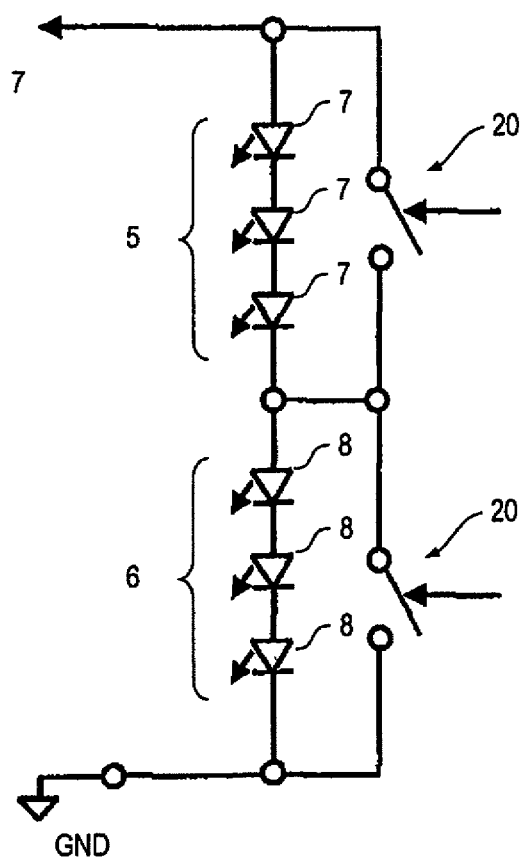
FIG. 7 shows a further possible principle circuit diagram of LED groups of a vehicle lighting device.

FIG. 7 shows a possible independent circuit comprising two LED sets using the LED groups 5, 6 shown in FIG. 2, which can be extended in a simple manner to any desired number of LED groups. In the embodiment shown, all of the LED groups 5, 6 are connected in series between an output of a driver 7 and ground GND, with a single switch 20 being connected in parallel with each LED group 5, 6. When the switch 20 is open, current flows in the section associated with the LED group 5, 6 through the corresponding light-emitting diodes 7 and 8, whereas, when the switch 20 is closed, the current is passed via the switch 20 ("is short-circuited"). Such a circuit can be implemented, for example, by means of a driver 7 with variable load. In order to save power, a resistor is provided in each branch provided with a switch 20. Preferably, the resistance value of such a resistor substantially corresponds to the load resistance of the associated LED group 5, 6, with the result that, even when a switch 20 is closed or when a plurality of switches 20 are closed, there is a substantially constant load; in this case, it is also possible for a driver module with a constant load to be used, which is particularly inexpensive.

The present invention is of course not restricted to the exemplary embodiments described, and therefore the number and arrangement of the light-emitting diodes can also be implemented differently.

For example, an LED group could have only a single light-emitting diode or have a plurality of light-emitting diodes of any desired number, i.e. two or more light-emitting diodes. Also, it is not necessary for the arrangement of the light-emitting diodes to be rectangular, i.e. in matrix form. In addition, instead of a white daytime running light, for example, it is also possible for a yellow daytime running light to be produced. A white light-emitting diode or white light-emitting diodes can be used, for example, as the light-emitting diode, or it is possible to use a cluster of differently colored light-emitting diodes which together produce a white mixed light, possibly by means of an optical element configured for this purpose. The use of an LED cluster has the advantage that the emitted color can be set variably.

The vehicle lighting device shown with the LED module, optical element(s), possibly a housing and/or an active or passive cooling element (for example a heat sink configured with cooling ribs), wiring, electrical terminals, etc. can also be referred to as an LED system. The vehicle lighting device or the LED system can be part of a lamp or represent a lamp. The vehicle lighting device or the lamp can be built into a vehicle headlamp, which in turn can be built into a vehicle.

Also, the primary optical element can also be produced, for example, as a body from a different transparent material.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

LIST OF REFERENCE SYMBOLS

1 Vehicle lighting device
2 LED module
3 Printed circuit board
4 Submount
5 First LED group
6 Second LED group
7 LED chip
8 LED chip
9 Drive electronics
10 Lens
11 Illumination region
12 Illumination region
13 Vehicle lighting device
14 First group
15 Illumination region
16 Vehicle lighting device
17 Primary optical element
18 Reflector
19 Transistor
20 Switch
A Set of light-emitting diode(s)
B Set of light-emitting diode(s)
C Set of light-emitting diode(s)
GND Connection to ground

The invention claimed is:

1. A vehicle lighting device comprising at least two semiconductor light-emitting elements, the vehicle lighting device comprising: at least a first light-emitting element group and a second light-emitting element group, each comprising at least one semiconductor light-emitting element, the light-emitting element groups being selectively drivable and the first light-emitting element group having at least a foglight function, the first light-emitting element group and the second light-emitting element group together creating a daytime running light function,
wherein at least the first light-emitting element group and the second light-emitting element group do not have a common semiconductor light-emitting element.

2. The vehicle lighting device as claimed in claim 1, wherein the first light-emitting element group is configured to illuminate at a lower luminous intensity during activation of the daytime running light function than during activation of the foglight function.

3. The vehicle lighting device as claimed in claim 2, wherein the second light-emitting element group in the daytime running light function is configured to illuminate at least a region which is in a region of darkness of the foglight function of the first light-emitting element group.

4. The vehicle lighting device as claimed in claim 1, wherein the first light-emitting element group and the second light-emitting element group have an upper beam function.

5. The vehicle lighting device as claimed in claim 1, further comprising: at least one of a third light-emitting element group and a fourth light-emitting element group, each having at least one semiconductor light-emitting element, which have a cornering light function for at least one of a respectively opposite steering movement and a foglight function.

6. The vehicle lighting device as claimed in claim 1, wherein the first light-emitting element group additionally has a cornering light function at least the first light-emitting element group having a plurality of light-emitting elements, which can be activated independently of the other light-emitting elements in the first light-emitting element group and in a plurality of stages.

7. The vehicle lighting device as claimed in claim 1, wherein at least one semiconductor light-emitting element comprises at least one light-emitting diode chip, and wherein differently configured semiconductor light-emitting elements are used for at least two of the light-emitting groups.

8. The vehicle lighting device as claimed in claim 1, wherein the light-emitting elements in at least one of the light-emitting element groups are arranged in at least one row, the light-emitting elements in at least two of the light-emitting element groups being arranged in in each case at least one row and the rows of these light-emitting element groups being arranged in parallel with one another in a horizontal arrangement one below the other.

9. The vehicle lighting device as claimed in claim 1, wherein an illumination region of the first light-emitting element group is asymmetrical with respect to a lateral extent.

10. The vehicle lighting device as claimed in claim 1, wherein, when the vehicle lighting device is switched on, there is a substantially identical load of the semiconductor light-emitting elements in the case of at least two, in particular all, types of illumination.

11. The vehicle lighting device as claimed in claim 1, wherein, when the vehicle lighting device is switched on, an identical number of semiconductor light-emitting elements is activated in the case of at least two types of illumination.

12. The vehicle lighting device as claimed in claim 11, wherein at least two sets of light-emitting elements are connected electrically in parallel and are associated with a respective type of illumination, with the device switching over between the sets in order to switch between the types of illumination.

13. The vehicle lighting device as claimed in claim 12, wherein at least one further set of light-emitting elements is connected electrically in series with at least two of the sets of light-emitting elements which are connected electrically in parallel.

14. The vehicle lighting device as claimed in claim 1, wherein the light-emitting element groups are connected electrically in series and at least one switch is connected in parallel with each light-emitting element group.

15. The vehicle lighting device as claimed in claim 14, wherein at least one resistor is connected electrically in series with at least one switch.

16. A vehicle headlamp, comprising: at least one vehicle lighting device, comprising: at least a first light-emitting element group and a second light-emitting element group, each comprising at least one semiconductor light-emitting element, the light-emitting element groups being selectively drivable and the first light-emitting element group having at least a foglight function, the first light-emitting element group and the second light-emitting element group together creating a daytime running light function, wherein at least the first light-emitting element group and the second light-emitting element group do not have a common semiconductor light-emitting element.

17. A vehicle comprising: at least one vehicle headlamp, comprising at least one vehicle lighting device, comprising: at least a first light-emitting element group and a second light-emitting element group, each comprising at least one semiconductor light-emitting element, the light-emitting element groups being selectively drivable and the first light-emitting element group having at least a foglight function, the first light-emitting element group and the second light-emitting element group together creating a daytime running light function, wherein at least the first light-emitting element group and the second light-emitting element group do not have a common semiconductor light-emitting element.

18. The vehicle lighting device as claimed in claim 1, which, in addition to the foglight function and the daytime running light function, additionally has at most at least one of an upper beam function and a cornering light function.

19. The vehicle lighting device as claimed in claim 7, wherein light-emitting diode chips with an emitter surface of different sizes are used for at least two of the light-emitting element groups.

* * * * *